United States Patent [19]

Narumi et al.

[11] Patent Number: 4,917,139
[45] Date of Patent: Apr. 17, 1990

[54] FLOW CONTROL APPARATUS FOR A POWER STEERING DEVICE

[75] Inventors: Tadataka Narumi, Kariya; Ryutaro Abe, Toyokawa; Susumu Honaga, Hoi; Yoshiyuki Toyama, Anjo, all of Japan

[73] Assignee: Toyoda Koki Kabushiki Kaisha, Kariya, Japan

[21] Appl. No.: 368,812

[22] Filed: Jun. 20, 1989

[30] Foreign Application Priority Data

Jun. 27, 1988 [JP] Japan ................. 63-158700

[51] Int. Cl.⁴ ................. G05D 7/01; G05D 16/04
[52] U.S. Cl. ................. 137/110; 137/117
[58] Field of Search ................. 137/117, 110

[56] References Cited

U.S. PATENT DOCUMENTS

| | | | |
|---|---|---|---|
| 4,396,033 | 8/1983 | Narumi | 137/117 |
| 4,598,730 | 7/1986 | Nakamura | 137/117 |
| 4,700,733 | 10/1987 | Uchino | 137/117 |
| 4,753,264 | 6/1988 | Uchino | 137/117 |
| 4,768,540 | 9/1988 | Mochizuki | 137/117 |

Primary Examiner—Alan Cohan
Attorney, Agent, or Firm—Oblon, Spivak, McClelland, Maier & Neustadt

[57] ABSTRACT

There is disclosed a flow control apparatus for a power steering device in which an operating fluid discharged from a pump is delivered to a power steering device through a restricted passage, and the fluid flow is adjusted by a spool valve movable in response to the pressure difference across the restricted passage. The spool valve contains a first relief valve operating at a first setting pressure in response to the fluid pressure transmitted from a passage located at the downstream side of the restricted passage through a connecting passage. The spool valve also contains a second relief valve operating at a second setting pressure higher than the first setting pressure, but lower than a allowable maximum load pressure, in response to the fluid pressure directly transmitted from a chamber located at the upstream side of the restricted passage. During operations under normal temperature conditions, the first relief valve operates when the load pressure reaches the first setting pressure. Under low temperature conditions, the second relief valve first operates at the second setting pressure, and then the first relief valve operates in order to reduce the fluid pressure to the first setting pressure. With this operation, the fluid pressure delivered to the power steering device is maintained not to exceed the maximum load pressure even under low temperature condition.

3 Claims, 3 Drawing Sheets

FLOW CONTROL APPARATUS FOR A POWER STEERING DEVICE

BACKGROUND OF THE INVENTION

1. Field of the Invention

The present invention relates to a flow control apparatus for use with a power steering device in which an operating fluid discharged from a pump is delivered to a power steering device through a restricted passage and an excess flow is returned to the suction side of the pump through a bypass passage.

2. Description of the Prior Art

In a conventional flow control apparatus for a power steering device, a relief valve for setting the maximum load pressure is contained in the flow adjusting spool valve, which controls the flow area of the bypass passage in response to the pressure difference across the restricted passage. With this arrangement, the flow of the operating fluid delivered to the power steering device is maintained at a predetermined value. In addition to that, the load pressure is adjusted by the relief valve not to exceed a predetermined allowable maximum pressure.

The prior flow control apparatus is able to prevent the load pressure from exceeding the maximum load pressure at the usual operating temperature, because the relief valve operates very quickly in response to an increase of the load pressure. However, the prior flow control apparatus is not able to prevent the load pressure from exceeding the maximum load pressure during starting periods under low temperature conditions, at which the temperature of the operating fluid also becomes low. Namely, since the viscosity of the operating fluid becomes high under such conditions and the load pressure is transmitted to the relief valve though a damping orifice and a connecting passage, the load pressure, which increases in response to actuations of the power steering device, is transmitted to the relief valve with a large time delay, thereby the load pressure of the power steering device sometimes exceeding the allowable maximum load pressure.

SUMMARY OF THE INVENTION

Accordingly, it is an object of the present invention to provide an improved flow control apparatus for a power steering device which is able to prevent the load pressure from exceeding a predetermined maximum load pressure even under low temperature conditions.

Another object of the present invention is to provide an improved flow control apparatus which has a secondary relief valve bypassing the operating fluid before the load pressure exceeds the maximum load pressure.

In accordance with the present invention, there is provided a flow control apparatus for a power steering device in which a hydraulic fluid discharged from a pump is delivered to the power steering device through a restricted passage, and the fluid flow is adjusted by a spool valve which is movable in response to the pressure difference across the restricted passage. The flow control apparatus includes a regular first relief valve operating at a first setting pressure in response to the fluid pressure transmitted from a passage located at the downstream side of the restricted passage through a connecting passage. The flow control apparatus also contains a second relief valve operating at a second setting pressure higher than the first setting pressure, but lower than a predetermined allowable maximum pressure, in response to the fluid pressure directly transmitted from a chamber located at the upstream side of the restricted passage. During operations under usual temperature conditions, the first relief valve operates when the load pressure reaches the first setting pressure. During starting periods under low temperature conditions, the first relief valve does not operate immediately because of the high flow resistance at the connecting passage which occurs due to the high viscosity of the operating fluid. However, under these conditions, the second relief valve operates without any time delay at the second setting pressure since the fluid pressure is directly transmitted to the second relief valve from the chamber located at the upstream side of the restricted passage. With this operation, the fluid pressure delivered to the power steering device is maintained not to exceed the maximum load pressure.

BRIEF DESCRIPTION OF THE ACCOMPANYING DRAWINGS

Various other objects, features and attendant advantages of the present invention will be more readily appreciated as the same becomes better understood by reference to the following detailed description of a preferred embodiment when considered in connection with the accompanying drawings, in which.

DETAILED DESCRIPTION OF THE PREFERRED EMBODIMENT

Figure 1:
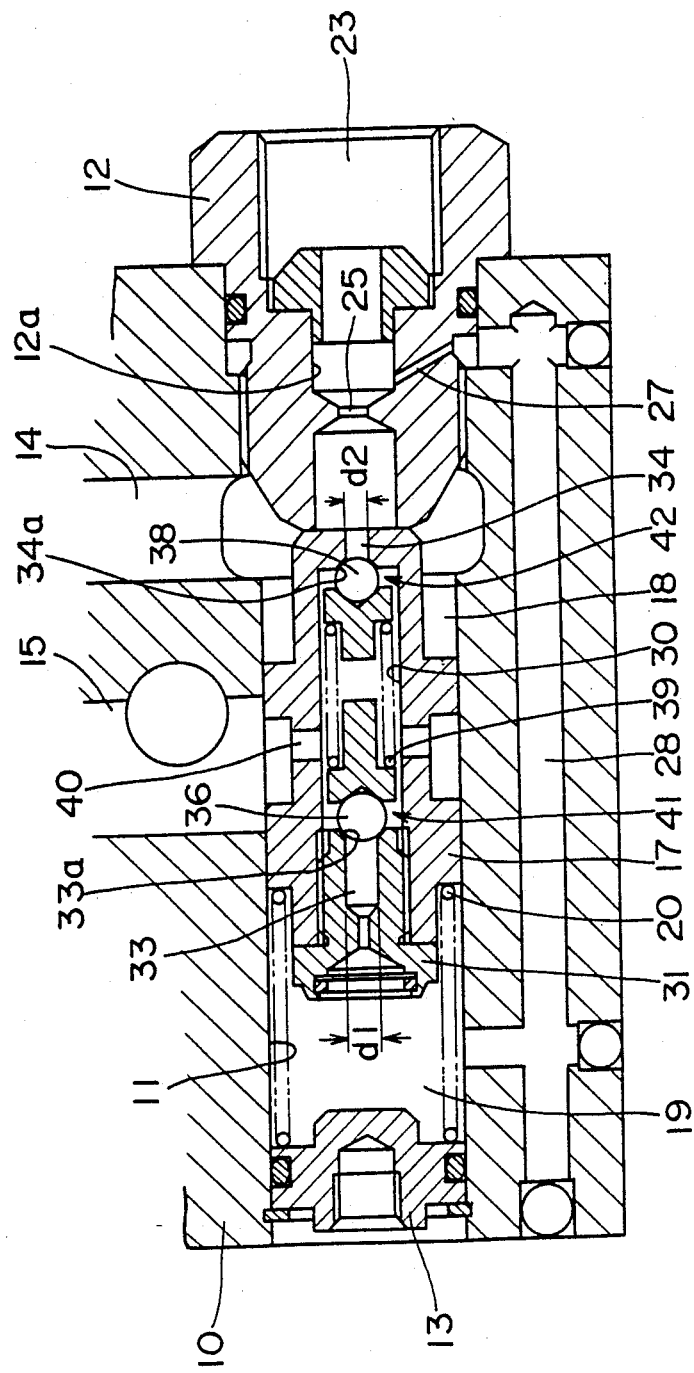
FIG. 1 is a cross sectional view of a flow control apparatus of the present invention which controls the flow of an operating fluid utilized for power steering purpose.

Referring to FIG. 1, the flow control apparatus according to the present invention includes a pump housing 10, through which a bore 11 extends to receive a valve therein. A union 12 is threadably engaged with one end of the bore 11 while a plug 13 is fitted in the other end thereof. An operating fluid delivery port 23 is formed in the union 12 for connection with a normally open servo valve unit of an associated power steering apparatus. Both a supply passage 14 and a bypass passage 15 open into the bore 11 at axially spaced points.

A flow regulating spool valve 17 is slidably disposed in the bore 11 to permit the communication between the both passages 14, 15 to be closed or the degree of such communication to be adjusted. A first and a second valve chambers 18, 19 are defined on the opposite sides of the spool valve 17. A spring 20 is disposed in the second valve chamber 19 for urging the spool valve 17 toward the first valve chamber 18, and its resilience normally maintains the spool valve 17 in abutment against one end of the union 12, thus interrupting the communication between the supply passage 14 which opens into the first valve chamber 18 and the bypass passage 15.

A restricted passage 25 is formed in the union 12 to connect the first valve chamber 18 and the delivery port 23. Furthermore, a damping orifice 27 is formed in the union 12, one end of which opens into a passage 12a located between the restricted passage 25 and the delivery port 23. The other end of the damping orifice 27 is connected to the second valve chamber 19 through a connecting passage 28 formed in the pump housing 10. With this arrangement, the operating fluid which has passed through the restricted passage 25 is introduced into the second valve chamber 19, and thus the fluid pressures at the both sides of the restricted passage 25 are applied to the both end faces of the spool valve 17 to move it axially in accordance with a pressure drop across the restricted passage 25. In this manner, the opening of the bypass passage 15 is adjusted so as to maintain the pressure drop across the restricted passage 25 constant.

The spool valve 17 is formed with a valve bore 30, and a valve cap 31 is threadably engaged with one end of the valve bore 30. One end of the valve bore 30 communicates with the second valve chamber 19 through a first pressure introducing opening 33 formed in the valve cap 31, and the other end of the valve bore 30 communicates with the first valve chamber 18 through a second pressure introducing opening 34 formed in the spool valve 17. A first ball valve 36 contacting with a valve seat 33a formed at the inner end of the first introducing opening 33 and a second ball valve 38 contacting with a valve seat 34a formed at the inner end of the second introducing opening 34 are received in the valve bore 30, and a spring 39 is disposed between the first and second ball valves 36, 38 for urging the ball valves 36, 38 toward the valve seats 33a and 34a, respectively. As a result, the first and second introducing openings 33, 34 are usually closed by the ball valves 36 and 38. The valve bore 30 also communicates with the bypass passage 15 through a radial opening 40 radially formed in the spool valve 17.

The first introducing opening 33, the first ball valve 36 and the spring 39 compose a first relief valve 41, and the second introducing opening 34, the second ball valve 38 and the spring 39 compose a second relief valve 42. The second introducing opening 34 is formed smaller in diameter than the first introducing openings 33, and thereby the second relief valve 42 operates at a setting pressure higher than that of the first relief valve 41. Namely, the setting pressure of the second relief valve 42 (hereinafter referred to as a second setting pressure) is $(d1/d2)^2$ times as high as the setting pressure of the first relief valve 41 (hereinafter referred to as a first setting pressure), wherein d1 indicates the effective diameter of the first introducing opening 33, and d2 (<d1) indicates the effective diameter of the second introducing opening 34. It is noted that both the first setting pressure and the second setting pressure are lower than a predetermined allowable maximum load pressure.

Figure 2:
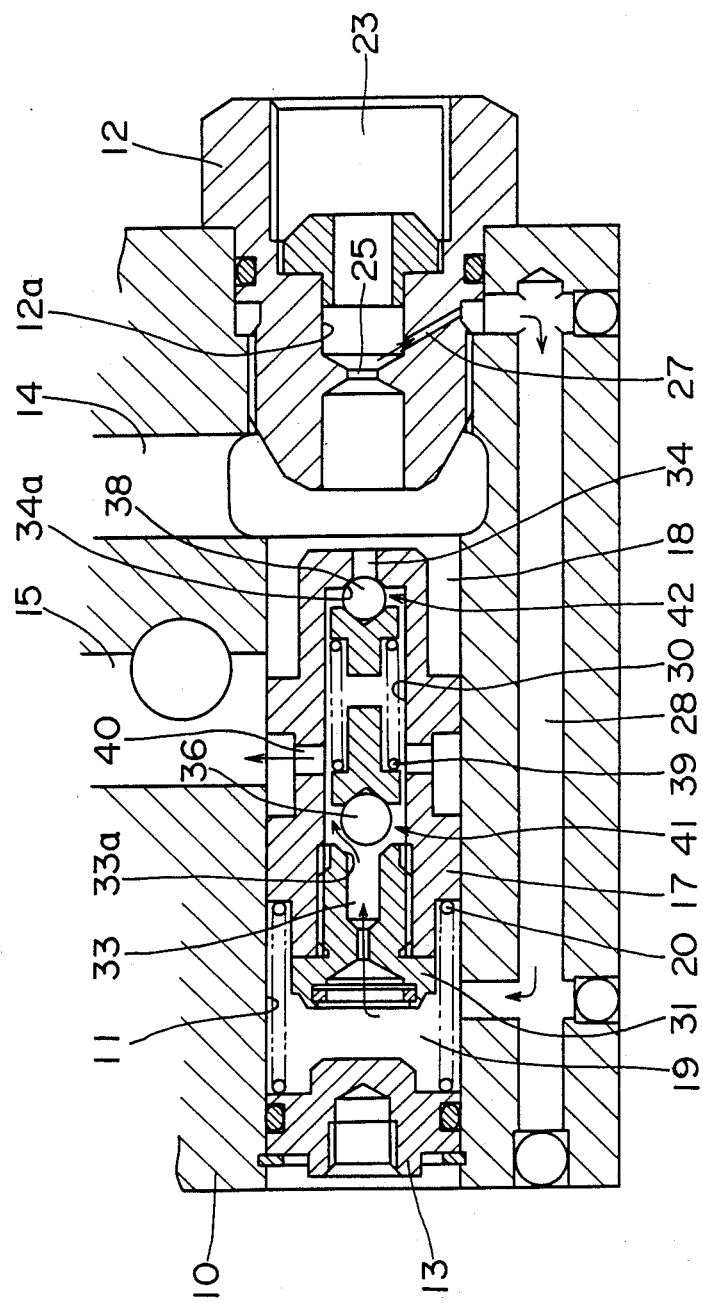
FIG. 2 is a similar view to FIG. 1, illustrating the operation of the apparatus shown in FIG. 1 under a usual temperature condition.

In operation, when the fluid pressure after passing through the restricted passage 25, or the fluid pressure at the passage 12a increases in response to an actuation of the power steering device, the fluid pressure is transmitted to the first relief valve 41 through the damping orifice 27, the connecting passage 28, the second valve chamber 19 and the first introducing opening 33, and hence the operating fluid is bypassed to the bypass passage 15 through the first relief valve 41 and the radial opening as shown in FIG. 2 when the fluid pressure reaches the first setting pressure. As a result, the load pressure of the power steering device is prevented from exceeding the first setting pressure.

Figure 3:
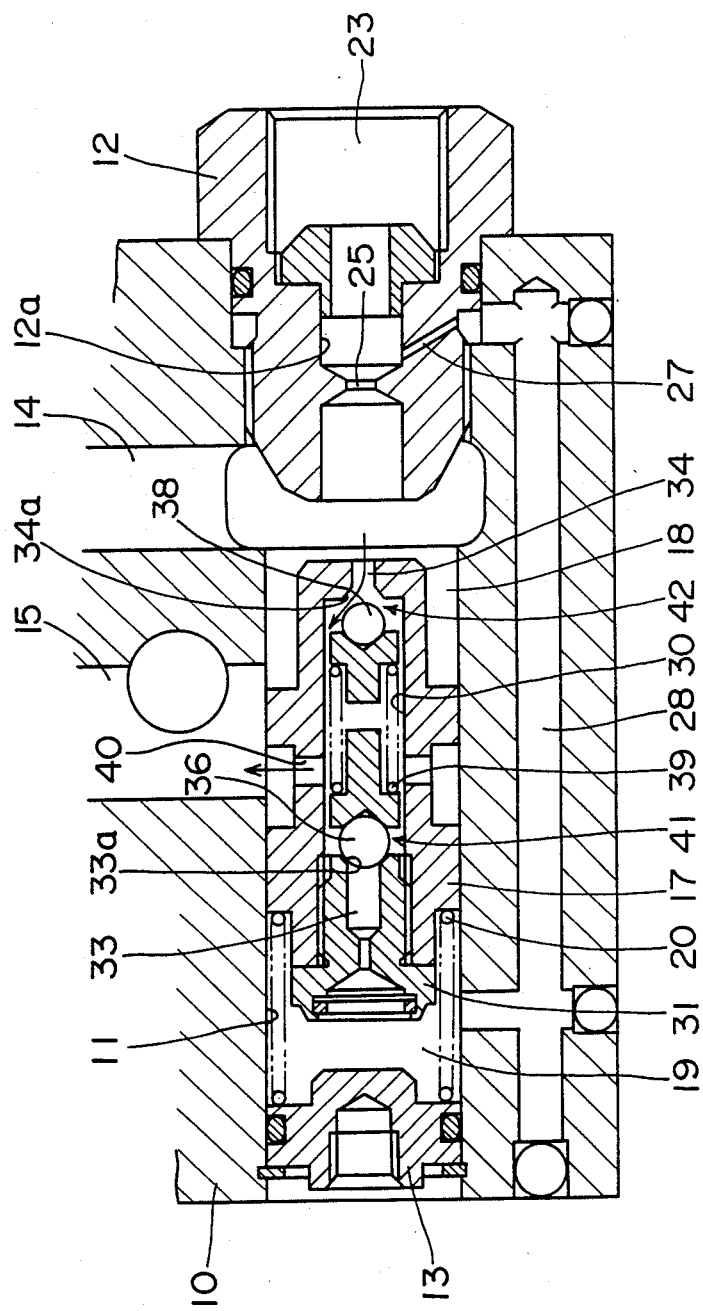
FIG. 3 is a similar view to FIG. 1, illustrating the operation of the apparatus shown in FIG. 1 under a low temperature condition.

During starting periods under low temperature conditions, the fluid pressure is transmitted to the first relief valve 41 with a large time delay, because the transmission speed of the fluid pressure becomes slow under such low temperature conditions due to an increase of the viscosity of the operating fluid and the throttle effect of the damping orifice 27 and the connecting passage 28. As a result, the first relief valve 41 does not immediately operate even if the fluid pressure or the load pressure exceeds the first setting pressure. However, when the fluid pressure reaches the second setting pressure, the second relief valve 42 immediately bypasses the operating fluid to the bypass passage 15. Namely, since the fluid pressure is directly transmitted to the second relief valve 42 without intervention of the damping orifice 27 and the connecting passage 28, the second ball valve 38 of the second relief valve 42 is immediately moved inwardly against the resilience of the spring 39 so that the operating fluid in the first valve chamber 18 flows into the bypass passage 15 through the second introducing opening 34, the valve bore 30 and the radial opening 40 as shown in FIG. 3. In the meanwhile the fluid pressure in the passage 12a is transmitted to the second relief valve 41 through the damping orifice 27, the connecting passage 28, the first valve chamber 19 and the first introducing opening 33, so that the first relief valve 41 is opened in order to reduce the fluid pressure to the first setting pressure. With this operation, the fluid pressure in the first valve chamber 18 is controlled not to exceed the allowable maximum load pressure, and thereby abnormal increase of the load pressure is prevented.

Under usual temperature condition, the fluid pressure in the first valve chamber 18 is transmitted to the fist relief valve 41 without any time delay since the viscosity of the operating fluid is low. Accordingly, when the load pressure reaches the first setting pressure, the operating fluid in the first valve chamber 18 and the supply passage 14 is immediately bypassed to the bypass passage 15 through the damping orifice 27, connecting passage 28, the second valve chamber 19 and the second relief valve 41, thereby being maintained not to exceed the first setting pressure. It is noted that the second relief valve, whose setting pressure is higher than that of the first relief valve 41, does not operate under this condition.

Although both the first and second relief valves 41, 42 are received in the spool valve 17 in the above embodiment, the second relief valve 42 can be assembled in the pump housing 10 separated from the spool valve 17.

Obviously, numerous modifications and variations of the present invention are possible in light of the above teachings. It is therefore to be understood that within the scope of the appended claims, the invention may be practiced otherwise than as specifically described herein.

What is claimed is:

1. A flow control apparatus for supplying pressurized fluid from a pump to a power steering device and for returning an excess part of said pressurized fluid to said pump, comprising:

a housing;

a bore formed in said housing;

a supply passage formed in said housing to be opened into said bore for supplying said pressurized fluid from said pump;

a bypass passage formed in said housing to be opened into said bore in spaced relationship with said supply passage for returning an excess part of said pressurized fluid directly to said pump;

a delivery port formed in said housing and fluidically communicated with said power steering device;

restricted passage means formed between said supply passage and said delivery port;

a spool valve slidably received in said bore and being movable in response to a pressure difference across said restricted passage means so as to maintain the fluid flow delivered to said power steering device constant, said spool valve dividing said bore into a first valve chamber communicating with said supply passage and a second valve chamber communicating with a passage located at the downstream side of said restricted passage means through a connecting passage;

a first relief valve provided in said spool valve to connect said second valve chamber and said bypass passage, said first relief valve operating at a first setting pressure in response to the fluid pressure transmitted from said second valve chamber ; and a second relief valve connecting said first valve chamber and said bypass passage, and operating at a second setting pressure higher than said first setting pressure in response to the fluid pressure directly transmitted from said first valve chamber.

2. A flow control apparatus according to claim 1, wherein said spool valve is formed with a valve bore, a first introducing opening connecting said valve bore with said second valve chamber, a second introducing opening connecting said valve bore with said first valve chamber and a radial opening connecting said valve bore with said bypass passage, and said first and second relief valves are received in said valve bore so as to control the communication between said first and second introducing openings and said radial opening, respectively.

3. A flow control apparatus according to claim 2, wherein said first relief valve and second relief valve consist of a first ball valve controlling the communication between said first introducing opening and said valve bore, a second ball valve controlling the communication between said second introducing opening and said valve bore and a common spring urging said first and second ball valves toward said first and second introducing openings, respectively, said second introducing opening being formed smaller in diameter than said first introducing opening.

* * * * *